US010939294B2

(12) United States Patent
Barrett et al.

(10) Patent No.: US 10,939,294 B2
(45) Date of Patent: *Mar. 2, 2021

(54) NETWORK ACCESS IDENTIFIER INCLUDING AN IDENTIFIER FOR A CELLULAR ACCESS NETWORK NODE

(71) Applicant: BlackBerry Limited, Waterloo (CA)

(72) Inventors: Stephen John Barrett, Haywards Heath (GB); Eswar Vutukuri, Havant (GB)

(73) Assignee: BlackBerry Limited, Waterloo (CA)

( * ) Notice: Subject to any disclaimer, the term of this patent is extended or adjusted under 35 U.S.C. 154(b) by 21 days.

This patent is subject to a terminal disclaimer.

(21) Appl. No.: 15/968,980

(22) Filed: May 2, 2018

(65) Prior Publication Data

US 2018/0249336 A1 Aug. 30, 2018

Related U.S. Application Data

(63) Continuation of application No. 14/824,898, filed on Aug. 12, 2015, now Pat. No. 9,980,133.

(51) Int. Cl.
*H04W 76/18* (2018.01)
*H04W 12/06* (2021.01)
*H04W 76/16* (2018.01)
*H04W 48/18* (2009.01)
*H04W 8/18* (2009.01)
*H04W 84/12* (2009.01)

(52) U.S. Cl.
CPC ....... *H04W 12/0608* (2019.01); *H04W 76/16* (2018.02); *H04W 76/18* (2018.02); *H04W 8/18* (2013.01); *H04W 48/18* (2013.01); *H04W 84/12* (2013.01)

(58) Field of Classification Search
CPC .................................................. H04W 12/06
See application file for complete search history.

(56) References Cited

U.S. PATENT DOCUMENTS

| 7,965,693 | B2 | 6/2011 | Jiang |
| 8,817,707 | B2 | 8/2014 | Gupta |
| 2008/0101291 | A1* | 5/2008 | Jiang ...................... H04L 63/08 370/331 |

(Continued)

FOREIGN PATENT DOCUMENTS

| CN | 1625868 A | 6/2005 |
| CN | 1655642 A | 8/2005 |

(Continued)

OTHER PUBLICATIONS

3GPP TS 23.003 V13.2.0; 3rd Generation Partnership Project; Technical Specification Group Core Network and Terminals; "Numbering, Addressing and Identification"; Release 13; Jun. 2015; 93 pages.

(Continued)

*Primary Examiner* — Michael T Vu
(74) *Attorney, Agent, or Firm* — Trop, Pruner & Hu, P.C.

(57) ABSTRACT

A user equipment (UE) sends, to a wireless access node in a wireless local area network (WLAN), a network access identifier (NAI) that includes an identifier for a cellular access network node. The UE receives an authentication challenge based on information in the NAI.

21 Claims, 11 Drawing Sheets

(56) References Cited

U.S. PATENT DOCUMENTS

| | | | |
|---|---|---|---|
| 2009/0186601 A1* | 7/2009 | Hahn | H04L 63/08 455/411 |
| 2011/0004762 A1 | 1/2011 | Horn | |
| 2013/0097418 A1 | 4/2013 | Bhatt et al. | |
| 2013/0097674 A1 | 4/2013 | Jindal | |
| 2015/0043564 A1 | 2/2015 | Liu | |
| 2015/0121490 A1* | 4/2015 | Liu | H04W 12/04 726/6 |
| 2015/0327065 A1* | 11/2015 | Mildh | H04W 12/06 455/411 |

FOREIGN PATENT DOCUMENTS

| | | |
|---|---|---|
| CN | 101026517 A | 8/2007 |
| CN | 103813327 A | 5/2014 |
| CN | 104243145 A | 12/2014 |
| JP | 2006515486 | 5/2006 |
| JP | 2015518685 | 2/2015 |
| JP | 2015104047 | 6/2015 |
| WO | 2004/032415 A1 | 4/2004 |
| WO | 2013/154895 A1 | 10/2013 |
| WO | 2013/181847 A1 | 12/2013 |
| WO | 2014/084760 A1 | 6/2014 |

OTHER PUBLICATIONS

3GPP TS 23.401 V13.3.0; 3rd Generation Partnership Project; Technical Specification Group Services and System Aspects; General Packet Radio Service (GPRS) Enhancements for Evolved Universal Terrestrial Radio Access Network, (E-UTRAN) access; Release 13; Jun. 2015; 342 pages.
3GPP TS 24.301 V13.2.0; 3rd Generation Partnership Project; Technical Specification Group Core Network and Terminals; Non-Access-Stratum (NAS) Protocol for Evolved Packet System (EPS); Stage 3, Release 13; Jun. 2015; 386 pages.
3GPP TS 33.401 V12.14.0; 3rd Generation Partnership Project; Technical Specification Group Services and System Aspects; 3GPP System Architecture Evolution (SAE); "Security Architecture", Release 12; Mar. 2015; 131 pages.
3GPP TS 33.402 V12.5.0; 3rd Generation Partnership Project; Technical Specification Group Services and System Aspects; 3GPP System Architecture Evolution (SAE); "Security Aspects of Non-3GPP Accesses," Release 12, Dec. 2014; 56 pages.
3GPP TS 36.331 V12.6.0; 3rd Generation Partnership Project; Technical Specification Group Radio Access Network; Evolved Universal Terrestrial Radio Access (E-UTRA); "Radio Resource Control (RRC); "Protocol Specification, Release 12; Jun. 2015; 449 pages.
3GPP TS 36.413 V13.0.0; 3rd Generation Partnership Project; Technical Specification Group Radio Access Network; Evolved Universal Terrestrial Radio Access Network (E-UTRAN); "S1 Application Protocol (S1AP)," Release 13; Jun. 2015; 302 pages.
3GPP TS 36.420 V12.1.0; 3rd Generation Partnership Project; Technical Specification Group Radio Access Network; Evolved Universal Terrestrial Radio Access Network (E-UTRAN); "X2 General Aspects and Principles," Release 12; Dec. 2014; 12 pages.

3GPP TS 36.423 V13.0.0; 3rd Generation Partnership Project; Technical Specification Group Radio Access Network; Evolved Universal Terrestrial Radio Access Network (E-UTRAN); "X2 Application Protocol (X2AP)"; Jun. 2015; 209 pages.
3GPP TSG-RAN WG Meeting #90, RAN WG2 Temporary Document; Source: BlackBerry UK Ltd.; "Comparison of Options for Authorising Access to the WLAN," for discussion and decision; Agenda item 7.6.2.1; Work Item/Release: LTE_WLAN_Radio/ Rel13; Fukuoka, Japan; May 25-29, 2015; 4 pages.
3GPP TSG-RAN WG2 Meeting #90, R2-152655; Agenda item: 7.6.2.1; Source: HiSilicon Huawei; "Authentication and Encryption Between UE and WLAN for Aggregation"; Fukuoka, Japan; May 25-29, 2015; 3 pages.
3GPP 2011, 3GPP Workshop, "3GPP LTE Security Aspects"; Dionisio Zumerle Technical Officer, 3GPP ETSI; Bangalore, May 30, 2011; 27 pages.
EPS Identification, "Authentication and Key Agreement, Key Derivation and Traffic Protection"; http://michau.benoit.free.fr/EPS-AKA_full-sec.png (1926 x 1384); 1 page.
Network Working Group; RFC 2865, Category: Standards Track; "Remote Authentication Dial in User Service (Radius)"; https:// tools.ietf.org/html/rfc2865; Copyright 2000; 152 pages.
Network Working Group; RFC 3748, Category: Standards Track; "Extensible Authentication Protocol (EAP)"; https://tools.ietf.org/ html/rfc3748; Copyright 2004; 134 pages.
Network Working Group; RFC 5448, Category: Informational; "Improved Extensible Authentication Protocol Method for 3rd Generation Authentication and Key Agreement (EAP-AKA')"; https:// tools.ietf.org/html/rfc5448; Copyright 2009; 58 pages.
Internet Engineering Task Force (IETF), RFC: 6733, Category: Standards Track, ISSN: 2070-1721; "Diameter Base Protocol"; https://tools.ietf.org/html/rfc6733; Oct. 2012; 304 pages.
Internet Engineering Task Force (IETF), RFC: 7542, Category: Standards Track, ISSN: 2070-1721; "The Network Access Identifier"; https://tools.ietf.org/html/rfc7542; May 2015; 60 pages.
Network Working Group; RFC 4186, Category: Informational; "Extensible Authentication Protocol Method for Global System for Mobile Communications (GSM) Subscriber Identity Modules (EAP-SIM)"; https://www.ietf.org/rfc/rfc4186.txt; Jan. 2006; 85 pages.
Cisco Public Information, White Paper; "Service Provider Wi-Fi Networks: Scaling Signaling Transactions"; http://www.wballiance. com/tag/authentication-signaling-optimization/; 2014; 20 pages.
Chris Yoo; Netmanias Tech-Blog; "IEE802.1X-based user authentication in Kt, SK Telecom and LG U+'s Wi-Fi networks"; http:// www.netmanias.com/en/post/blog/7281/802-1x-kt-lg-u-sk-telecom-wi-fi/iee-802-1x-based-user-authentication-in-kt-sk-telecom-and-lg-u-s-wi-fi-networks, Feb. 26, 2015; 5 pages.
European Patent Office, International Search Report and Written Opinion for PCT/EP2016/069243 dated Nov. 17, 2016 (13 pages).
Ruckus, White Paper, How Interworking Works: A Detailed Look at 802.11u and Hotspot 2.0 Mechanisms, Jul. 2013 (12 pages).
3GPP TR 23.865 v0.5.0, 3rd Generation Partnership Project; Technical Specification Group Services and System Aspects; WLAN Network Selection for 3GPP Terminals; Stage 2 (Release 12) (Feb. 2013) (30 pages).
European Patent Office, Communication pursuant to Article 94(3) EPC for Appl. No. 16754255.4 dated Feb. 26, 2020 (6 pages).

* cited by examiner

NETWORK ACCESS IDENTIFIER INCLUDING AN IDENTIFIER FOR A CELLULAR ACCESS NETWORK NODE

CROSS REFERENCE TO RELATED APPLICATIONS

This is a continuation of U.S. application Ser. No. 14/824,898, filed Aug. 12, 2015, which is hereby incorporated by reference in their entirety.

BACKGROUND

Devices such as computers, handheld devices, or other types of devices can communicate over wired or wireless networks. Wireless networks can include cellular networks that include cells and associated cellular access network nodes. A wireless device within a cell can connect to a corresponding cellular access network node to allow the device to communicate with other devices.

Another type of wireless network is a wireless local area network (WLAN), which includes wireless access points to which devices are able to wirelessly connect.

BRIEF DESCRIPTION OF THE DRAWINGS

Some implementations are described with respect to the following figures.

DETAILED DESCRIPTION

Figure 1A:
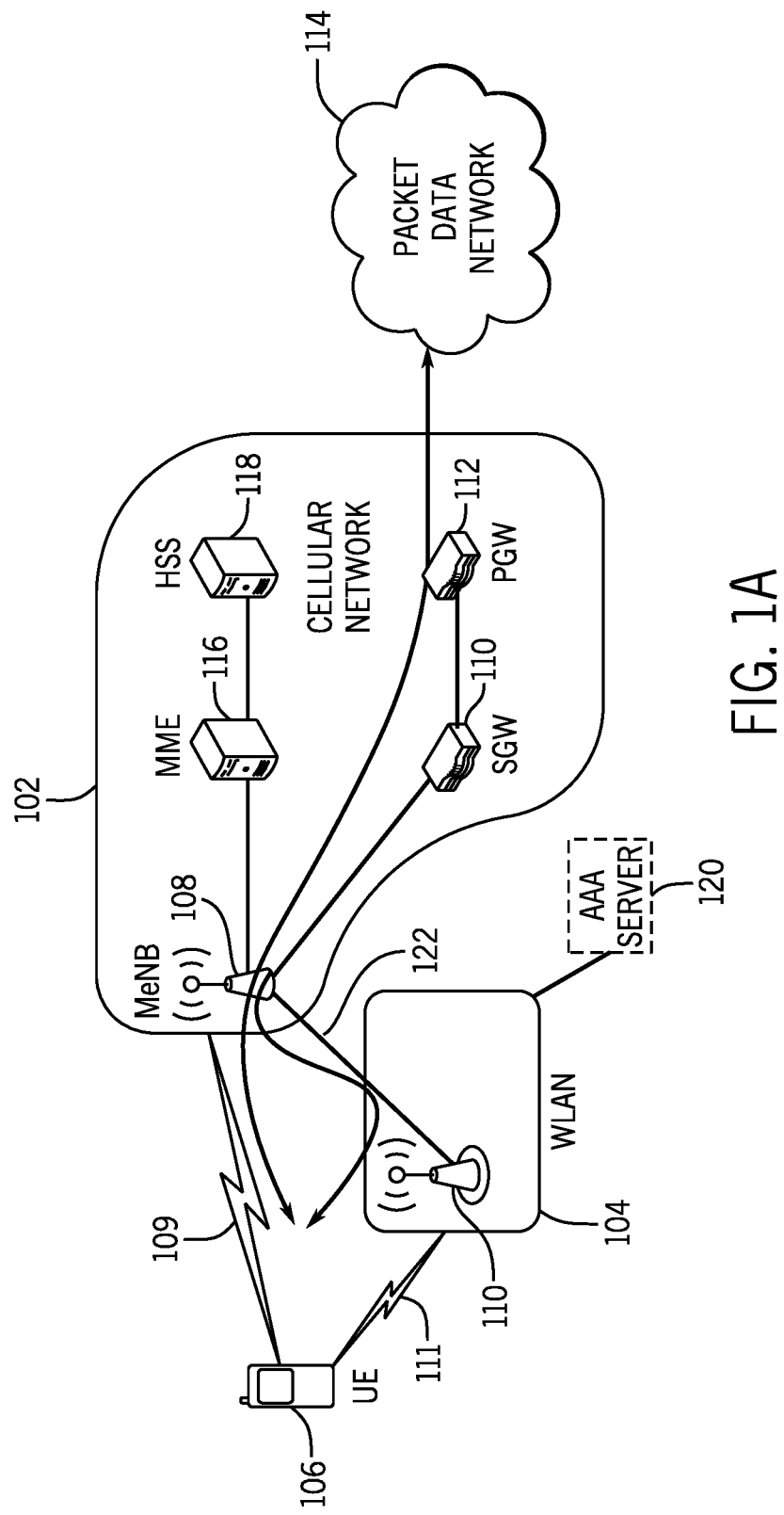
FIGS. 1A and 1B are schematic diagrams of example network arrangements in which techniques or mechanisms according to some implementations can be incorporated.

FIG. 1A illustrates an example network arrangement that includes a cellular network 102 and a wireless local area network (WLAN) 104. FIG. 1A also shows a user equipment (UE) 106 that is at a location within the coverage area of both the cellular network 102 and the WLAN 104. The UE 106 can be a dual mode UE (or more generally, a multi-mode UE) that is capable of communicating with different types of wireless access networks, which in the example of FIG. 1A include the cellular network 102 and the WLAN 104.

A UE can refer to any of the following: a computer (e.g. desktop computer, notebook computer, tablet computer, server computer, etc.), a handheld device (e.g. a personal digital assistant, smartphone, etc.), a wearable device that can be worn on a person, a computer embedded in a vehicle or appliance, a storage device, a communication node, and so forth.

The cellular network 102 can operate according to the Long-Time Evolution (LTE) standards (or other standards) as provided by the Third Generation Partnership Project (3GPP). The LTE standards are also referred to as the Evolved Universal Terrestrial Radio Access (E-UTRA) standards. Although reference is made to LTE or E-UTRA in the ensuing discussion, it is noted that techniques or mechanisms according to some implementations can be applied to other wireless access technologies, such as 5G (fifth generation) technologies.

The cellular network 102 includes a cellular access network node 108, which is able to communicate wirelessly with the mobile device 106 over a cellular radio link 109. Although just one cellular access network node is depicted in FIG. 1A, it is noted that the cellular network 102 can include multiple cellular access network nodes that correspond to respective cells of the cellular network 102. A cell can refer to the coverage area provided by a corresponding cellular access network node. UEs can move between cells and connect to respective cellular access network nodes.

In an E-UTRA network, the cellular access network node 108 can be implemented as an E-UTRAN Node B (eNB), which includes the functionalities of a base station and base station controller. In the ensuing discussion, the cellular access network node 108 is also interchangeably referred to as an eNB 108. Although reference is made to eNBs in the ensuing discussion, it is noted that techniques or mechanisms according to the present disclosure can be applied with other types of cellular access network nodes that operate according to other protocols.

The cellular network 102 also includes a core network, which includes various core network nodes. As examples, in an Evolved Packet System (EPS) cellular network, the core network nodes can include a serving gateway (SGW) 110 and a packet data network gateway (PDN-GW) 112. The PDN-GW 112 is the entry and egress point for data communicated between a UE in the E-UTRA network and the packet data network (PDN) 114, e.g. the Internet or another network. The SGW 110 routes and forwards traffic data packets of a UE between the MeNB 108 and PDN-GW 112. The SGW 110 can also act as a mobility anchor for the user plane during handover procedures.

In an Evolved Packet System, the core network nodes can also include a control node referred to as a mobility management entity (MME) 116. The MME 116 is a control node for performing various control tasks associated with an E-UTRA network. For example, the MME 116 can perform idle mode mobile device tracking and paging, bearer activation and deactivation, selection of a serving gateway when a mobile device initially attaches to the E-UTRA network, handover of the UE between eNBs, authentication of a user, generation and allocation of a temporary identity to a mobile device, and so forth. In other examples, the MME 116 can perform other or alternative tasks.

The core network nodes can further include a home subscriber server (HSS) 118, which is a master user database that contains subscription-related information (subscriber profiles), and is used when performing authentication and authorization of a user, and can provide information about the user's location and core network entities that are currently handling the user.

When connected to the cellular access network node 108, the UE 106 is able to communicate with other devices, which can be connected to the cellular network 102 or can be connected to other networks, including wired and/or wireless networks.

The WLAN 104 includes a wireless access point (AP) 110. The UE 106 can communicate with the wireless AP 110 over a WLAN radio link 111. Although just one wireless AP is depicted in FIG. 1A, it is noted that the WLAN 104 can include multiple wireless APs that provide respective coverage areas. In some implementations, the WLAN 104 can operate according to the Institute of Electrical and Electronics Engineers (IEEE) 802.11 standards. Note that the WLAN 104 that operates according to the 802.11 standards can also be referred to as a Wi-Fi network. In other examples, the WLAN 104 can operate to different standards. It is noted that IEEE 802.11 also supports direct communications between terminal devices, such as between mobile devices. Such direct communications (which do not pass through any APs) can be referred to as WLAN direct communications or Wi-Fi direct communications.

The WLAN 104 can optionally be connected to an Authentication, Authorization, and Accounting (AAA) server 120. An AAA server is used to perform access control, where authentication is used to identify a user, authorization is used to implement policies that determine which network resources and services a user can access, and accounting is used to track resources used for billing and analysis purposes. An AAA server can refer to a node or a collection of nodes that provide services of the AAA server, or alternatively, an AAA server can refer to machine-readable instructions that provide services of the AAA server.

Cellular network operators that provide cellular networks in a licensed spectrum are running out of new spectrum to purchase, and the spectrum that is available can be costly to license. Thus cellular network operators are looking for ways to expand capacity of cellular networks by offloading a portion of user plane traffic to a WLAN. In this way, UEs can be simultaneously connected to both a cellular network and a WLAN. Integrating a WLAN into an LTE cellular network is referred to as LTE-WLAN aggregation. With LTE-WLAN aggregation, user plane traffic can be transmitted by a UE to an eNB via a WLAN, and user plane traffic can be received by a UE from an eNB via a WLAN.

In the LTE-WLAN aggregation architecture, such as that depicted in FIG. 1A, the eNB 108 can be referred to as a Master eNB (MeNB), while the AP 110 in the WLAN 104 can be considered to provide a small cell to which the MeNB 108 can offload a portion of user plane traffic.

Figure 1B:
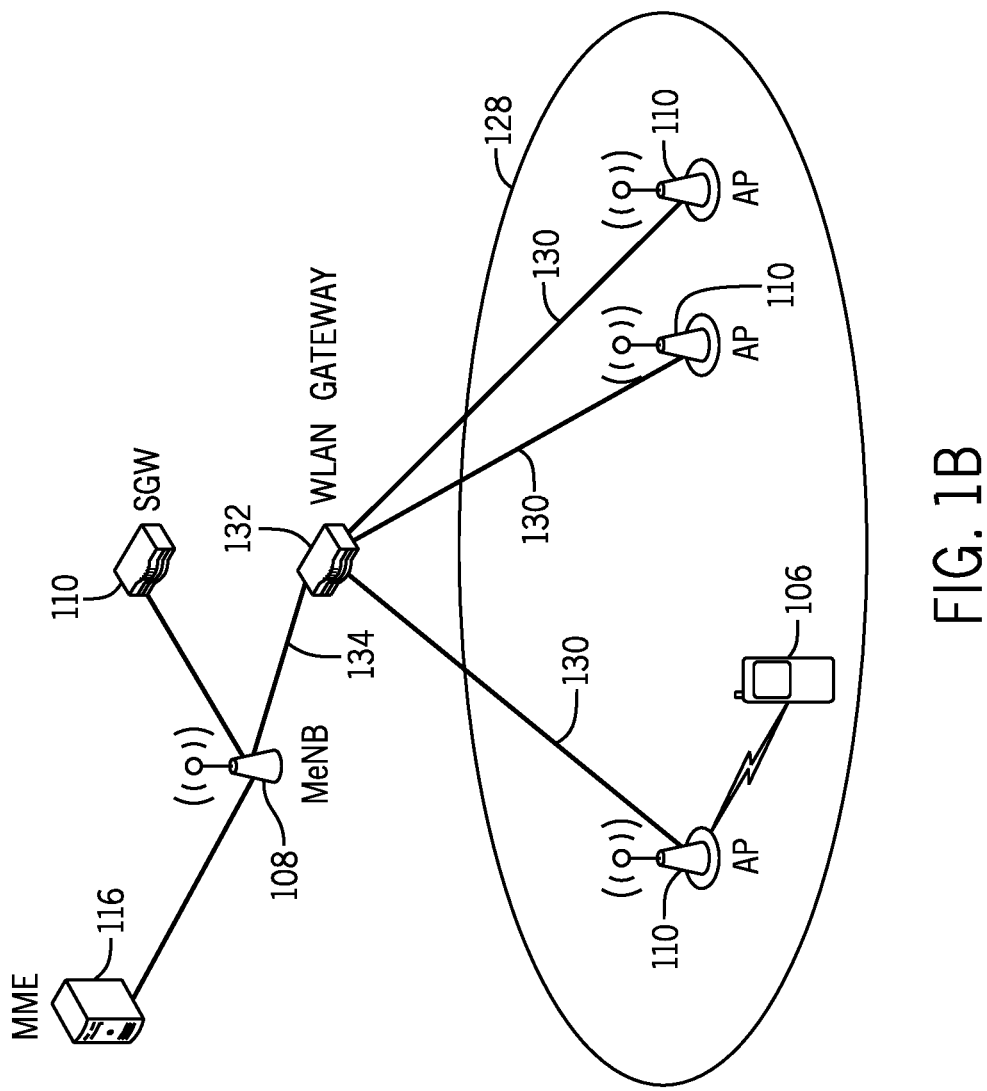

FIG. 1A shows an architecture where the AP 110 is connected over a link 122 to the MeNB 108. FIG. 1B shows an alternative example arrangement of an LTE-WLAN aggregation architecture, in which multiple WLAN APs 110 (which are part of a WLAN 128) are connected over respective links 130 to a WLAN gateway 132, which in turn is connected over a link 134 to the MeNB 108.

Traditionally, a WLAN and a cellular network can each perform their respective authentication procedures for authenticating a user of a UE that is attempting to access the WLAN or cellular network, respectively. Authentication procedures used by the WLAN are typically different from authentication procedures used by a cellular network. If LTE-WLAN aggregation is employed, various issues may arise relating to performing authentication procedures.

In the ensuing discussion, it is noted that an "authentication procedure" can include just authentication tasks, or both authentication and authorization tasks. Authentication generally refers to authenticating a UE or a user of a UE that is attempting to access a network. In the ensuing discussion, reference is made to "authenticating a UE." It is noted that authenticating a UE can refer to either authenticating an identity of the UE, or authenticating an identity of a user of the UE. Authorization can refer to implementing policies that determine which network resources and services a UE or a user of a UE may access.

In some cases, it may be desirable to use WLAN authentication procedures in the context of LTE-WLAN aggregation. A first issue (referred to as "Issue 1") associated with using WLAN authentication procedures in the context of LTE-WLAN aggregation is that core network signaling for performing authentication procedures may have to be routed from a WLAN through an eNB to the core network of the cellular network. In some cases, such as shown in FIGS. 1A and 1B, the only interface from the WLAN into the core network is through an eNB (such as MeNB 108). Specifying that the only interface into the core network is via the MeNB allows for the so called "one network" operation where a single core network is used to support and transport traffic over both the licensed spectrum (of the LTE cellular network) and the unlicensed spectrum (of the WLAN).

A second issue (referred to as "Issue 2") is that in some cases, a WLAN may be connected to an AAA server (e.g. AAA server 120 in FIG. 1A), while in other cases, a WLAN may not be connected to an AAA server. In cases where a WLAN is connected to an AAA server, regular WLAN authentication procedures using the AAA server may be employed. However, in cases where a WLAN is not connected to an AAA server, then authentication procedures can be performed through the MeNB. Thus, depending on the specific arrangement of a communications network, different operators may specify different authentication procedures. Thus, Issue 2 is related to how a UE is informed of which authentication procedure to employ.

A third issue (referred to as "Issue 3") is that it is desired that excessive signaling overhead be reduced by avoiding additional interactions with the core network for an authentication procedure at the time of adding connectivity between the UE and the WLAN, in cases where authentication procedure signaling is routed through the MeNB. With Issue 3, it is desired that the interaction with the LTE core network for authentication procedures occurs only at the time of UE attachment to the cellular network, and not at the time of UE attachment to the WLAN.

In accordance with some implementations of the present disclosure, various solutions are provided to address one or more of the foregoing issues.

Routing An Authentication Message from a WLAN to an MeNB

In accordance with some implementations, a network access identifier (NAI) is modified to include an identifier of a cellular access network node (e.g. an eNB) that enables a WLAN node (such as a WLAN AP or WLAN gateway) to send an authentication message to a specific eNB, as opposed to an AAA server. An NAI refers to an identifier that is used for identifying a user who is requesting access to a network. NAIs are described in Request For Comments (RFC) 7542, entitled "The Network Access Identifier," dated May 2015.

Traditionally, a purpose of an NAI is to allow a WLAN to determine to which AAA server authentication messaging is to be sent. Another purpose of an NAI is to identify a user (subscriber) who is requesting authentication and authorization.

In accordance with some implementations of the present disclosure, a WLAN node can use a modified NAI (that includes an identifier for an eNB) to select an eNB (from among multiple eNBs) to send an authentication message. As explained above, the identifier for the eNB can be a cell identifier for identifying a cell, or an eNB identifier for identifying the eNB (or more generally, an identifier of a cellular access network node). An "identifier" can refer to any alphanumeric string, code, or any other information that can be used to identify an entity, such as a cell or cellular access network node noted above.

Figure 2:
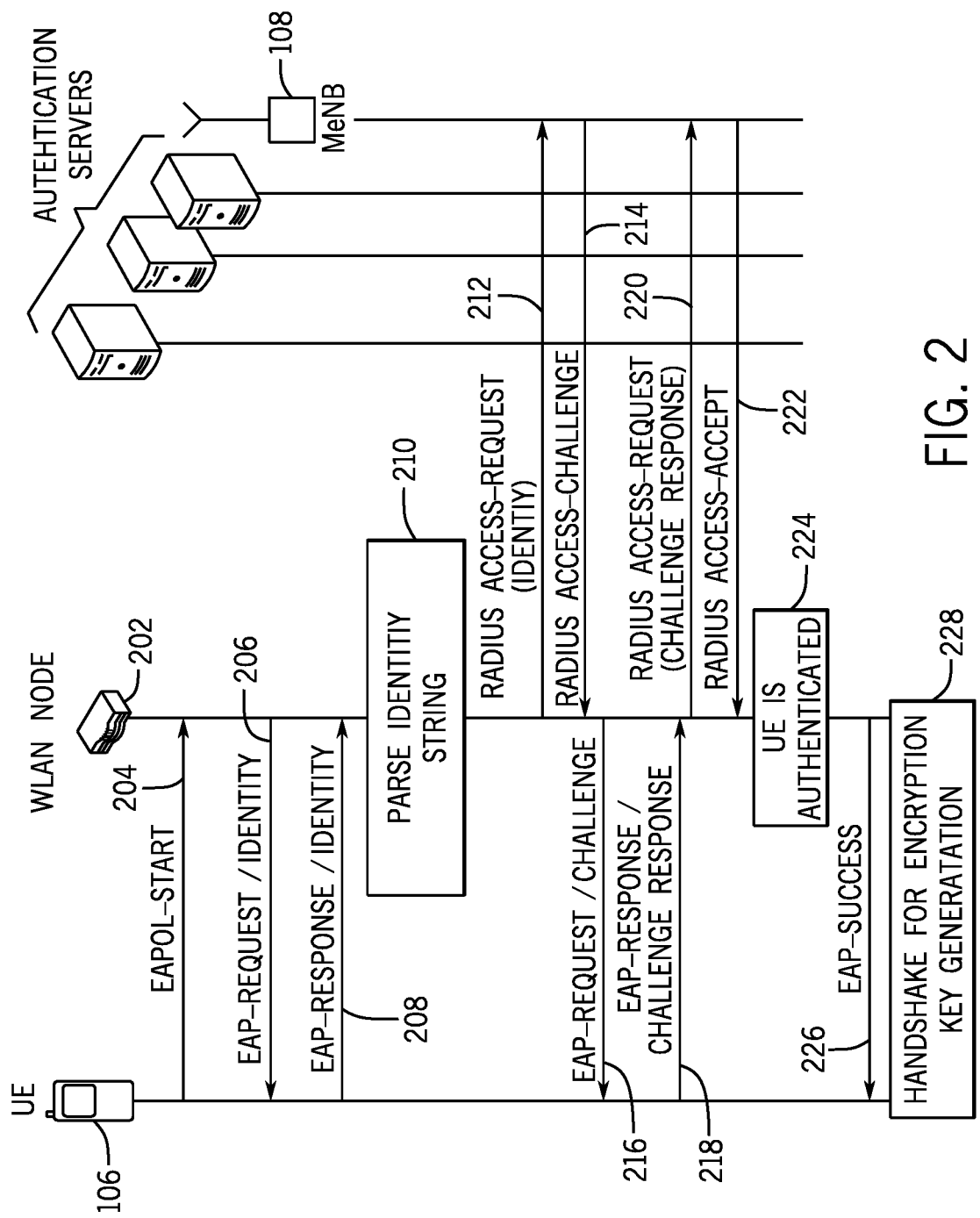
FIG. 2 is a message flow diagram of an example authentication process according to some implementations.

FIG. 2 is a message flow diagram illustrating messages and tasks performed by various nodes, including the UE 106, a WLAN node 202 (e.g. an AP 110 or WLAN gateway 132), and the MeNB 108. According to FIG. 2, to perform authentication, the UE 106 can exchange messaging with the WLAN node 202 according to the Extensible Authentication Protocol (EAP), which is an authentication framework that supports multiple authentication techniques referred to as EAP techniques. EAP is described in RFC 3748, entitled "Extensible Authentication Protocol (EAP)," dated June 2004. Although reference is made to EAP in some examples, it is noted that in other examples, authentication messaging between the UE 106 and the WLAN node 202 can be according to other authentication protocols.

The UE 106 sends (at 204) an EAP over local area network (EAPOL)-Start message to the WLAN node 202. The EAPOL-Start message is a multicast message that is sent to a multicast group, which is used by the UE 106 to determine if an authenticator (and more specifically a WLAN node 202 that can operate as an authenticator) is present. In response to the EAPOL-Start message, the WLAN node 202 sends (at 206) an EAP-Request/Identity message to the UE 106. The Identity string of the EAP-Request message contains an identity of the WLAN node 202.

In response to the EAP-Request/Identity message, the UE 106 sends (at 208) an EAP-Response/Identity message, where the Identity string in the EAP-Response/Identity message can include the modified NAI according to some implementations as discussed above. An example of an NAI that can be included in the Identity string of the EAP-Response message is as follows:

user@MeNB1.02.co.uk.

In the example NAI above, "user" can be an International Mobile Subscriber Identity (IMSI) to identify a user (subscriber) of the UE 106. In other examples, other user identifiers can be employed. The string "O2.co.uk" identifies the domain of the cellular operator (e.g. O2) that operates the cellular network, while the string "MeNB1" in the NAI identifies a particular eNB or a cell of a particular eNB, in this case MeNB 108. In another example, the string that identifies the domain of the cellular network operator can be as described in 3GPP TS 23.003 and can take the form of, for example, wlan.mnc015.mcc234.3gppnetwork.org, where the mnc015.mcc234 portion of this string provides a reference to a cellular operator subscription provider whose mobile network code is 015 and whose mobile country code is 234.

As described in 3GPP TS 23.003, the NAI may also include an additional string, herein called Auth_type, to indicate to the WLAN the type of authentication that is to be performed. For example, if a "0" is placed at the beginning of the NAI then this indicates that EAP-AKA authentication is to be used while a "1" indicates that EAP-SIM authentication is to be used. An additional string can be added to the NAI to indicate the method by which the WLAN is expected to interact with other network elements in order to complete the authentication process, and specifically whether authentication messaging is to be conveyed between the WLAN and a cellular access node or between WLAN and an AAA server. Alternatively new values of the existing authentication type identifying string described in 3GPP TS 23.003 can be defined to indicate both the type of EAP method and the method for conveying authentication messaging between the WLAN and other network nodes. Although specific example NAIs are provided, it is noted that in other examples, NAIs according to other formats can be employed, where such NAIs according to such other formats can also include identifiers for cellular access network nodes, such as the MeNB 108.

Upon receipt of the Identity string in the EAP-Response message, the WLAN node 202 parses (at 210) the Identity string to identify an eNB that is to be used to perform an authentication procedure. In the example according to FIG. 2, the identified eNB is the MeNB 108.

The WLAN node 202 then sends (at 212) an authentication message to the identified MeNB 108. The authentication message sent by the WLAN node 202 to the MeNB 108 can include an Identity string, which can be the NAI received by the WLAN node 202, or alternatively, can be a modified version of the NAI (such as with the substring MeNB1 removed). In some implementations, the authentication message sent (at 212) can be according to a protocol to perform authentication and authorization. In some examples, such a protocol can be a Remote Authentication Dial-In User Service (RADIUS) protocol, which is a networking protocol to provide AAA management for users who connect and use a network service. RADIUS is described in RFC 2865, entitled "Remote Authentication Dial In User Service (RADIUS)," dated June 2000. In other examples, the authentication message (sent at 212) can be according to a Diameter Base Protocol, as described in RFC 6733, entitled "Diameter Base Protocol," dated October 2012. In further examples, other authentication protocols can be employed.

In response to receipt of the authentication message sent at 212, the MeNB 108 can perform authentication autonomously in response to the authentication message, or alternatively, the MeNB 108 can act as an authentication proxy and involve an authentication server (such as the HSS 118 shown in FIG. 1A) for performing an authentication procedure. An authentication challenge can be issued based on the NAI in the authentication message.

In response to the authentication message sent at 212, the MeNB 108 sends (at 214) the authentication challenge to the WLAN node 202. In some examples, the authentication challenge is a RADIUS Access-Challenge message according to the RADIUS protocol. In other examples, the authentication challenge can be according to a different protocol, such as the Diameter Base Protocol or other protocol. More generally, an authentication challenge can refer to any message that is sent for the purpose of evoking a response from a target node, where the response is used for authenticating the target node.

In response to the authentication challenge (sent at 214), the WLAN node 202 sends (at 216) an authentication challenge to the UE 106, where this authentication challenge can be an EAP-Request/Challenge message.

The UE 106 responds to the authentication challenge by sending (at 218) an authentication challenge response, which can be an EAP-Response/Challenge message in some examples. In response to the authentication challenge response, the WLAN node 202 sends (at 220) an authentication challenge response to the MeNB 108. In some examples, the authentication challenge response sent by the WLAN node 202 to the MeNB 108 can be a RADIUS Access-Request (challenge response) message, or can be a message according to a different protocol.

In response to the authentication challenge response from the WLAN node 202, the MeNB 108 sends (at 222) an access accept to the WLAN node 202. In some examples, this access accept can be a RADIUS Access-Accept message, or an access accept according to a different protocol.

In response to receiving the access accept message from the MeNB 108, the WLAN node 202 indicates (at 224) that the UE 106 is authenticated and access of the WLAN is granted to the UE 106. The WLAN at this point opens the 802.1X controlled port of the WLAN, the effect of which is to enable traffic other than just EAP messages, and including for example IP traffic, to be conveyed between the UE and the cellular network. In response, the WLAN node 202 sends a success indication (at 226), such as an EAP-Success message or some other message. A further exchange (at 228) of messaging can be performed for generation of an encryption key between the UE 106 and the WLAN node 202.

There are a number of ways that an identifier for the eNB can be obtained at the UE 106. As examples, any or some combination of the following can be performed:

The UE derives an eNB identifier (ID) based on other network identifiers such as a cell ID, a Public Land Mobile Network (PLMN) ID, and so forth.

The eNB derives an ID that would identify a routable path between the WLAN node and the eNB, and passes the derived ID to the UE, such as by using dedicated Radio Resource Control (RRC) messaging.

The eNB signals a routable eNB ID for the purposes of WLAN aggregation in a system information broadcast message.

In other examples, other techniques of deriving an identifier for the eNB can be used.

The following provides examples of modified NAIs according to the present disclosure, where an identifier for an eNB is underlined in each example NAI.

Two types of NAIs can be specified, as described in 3GPP TS 23.003, for example. A first type of NAI is a root NAI, while a second type of NAI is a decorated NAI.

A root NAI is the type of NAI that is used when the UE is attempting to authenticate on a network where the AAA server of the user's home subscription provider is directly accessible. The root NAI can have the form: username@realm, where username can be derived from an IMSI, and realm can be derived from the subscription provider's mobile network code (MNC) and mobile country code (MCC) (which collectively provides a PLMN code).

A decorated NAI is used if an authentication message (e.g. an EAP message) has to be routed via another AAA server (in "otherrealm") that is other than the AAA server of the user's home subscription provider. As an example, the UE may be roaming in a visited PLMN (VPLMN) and wants to use the WLAN service provided by the VPLMN; as a result, the authentication message to the AAA server has to be routed first to the VPLMN and then to the home PLMN (HPLMN). A decorated NAI can have the form: homerealm!username@otherrealm.

Various options of modified NAIs are listed below.

Option 1 (Root NAI Realm Includes Cell ID)

According to Option 1, an identifier for an eNB (underlined text) included in a root NAI is a cell ID. An example of such a root NAI is set forth below:

Auth_type<Identity_desc>@wlan.cellid523768193.
mnc015.mcc234.3gppnetwork.org

In this root NAI, the underlined text is a cell ID of a cell of the MeNB to which the UE is connected. The cell ID (cellid523768193 in the example) is added to the NAI realm of the root NAI, where the NAI realm in this example is the part of the string following the @ symbol. The cell ID is globally unique when referenced relative to a particular PLMN code. The WLAN node can, for example, perform a lookup on the realm to acquire the IP address of the MeNB. For example, the lookup can be a Domain Name System (DNS) lookup at a DNS server. Alternatively, the lookup can be of a table statically configured at the WLAN node. If an eNB provides multiple cells, note that all cell IDs of these multiple cells can be expected to result in realms that resolve to the same (eNB) IP address.

In cases where just eNBs associated with only one PLMN are attached to the WLAN, it is possible that the MNC/MCC does not have to be included in the NAI. However, to cover the possibility of WLAN network sharing scenarios, it is proposed to keep the MNC/MCC in the NAI in some implementations.

Option 2 (Root NAI Realm Includes eNB Identifier)

According to Option 2, an identifier for an eNB (underlined text) included in a root NAI is an eNB ID. An example of such a root NAI is set forth below:

Auth_type<Identity_desc>@wlan.enbid83456789.
mnc015.mcc234.3gppnetwork.org

In this root NAI, the underlined text is an eNB ID (enbid83456789 in the example) that uniquely identifies an eNB, and is included in the realm of the root NAI. In some examples, the eNB ID can be provided by the eNB to the UE using RRC messaging (or other messaging). The eNB ID may be derived by the eNB; for example the eNB identifier can be set as the cell ID of an arbitrarily selected sector in the eNB. The eNB ID can include any ID that can uniquely identify the eNB for the purposes of IP routing of AAA messages from the WLAN node towards the eNB. Potentially, the eNB ID can be derived from the IP address of the eNB on the IP network that connects the eNB to the WLAN. Note that such an eNB ID is not currently used in regular E-UTRAN communications and hence can be specified as an additional information element (IE) in an RRC message or other message.

Option 3 (Decorated NAI Realm Includes Cell ID)

If the UE is cellular roaming on a VPLMN, then a decorated NAI may be used (e.g. for the case where the MeNB in the VPLMN has to forward the EAP message to an AAA server on the HPLMN, such as in the solution where the MeNB acts as an authentication proxy, discussed further below in the "MeNB Behaving as an Authentication Proxy" section). A decorated NAI includes 2 realms, the first realm to appear in the string is the realm of the home network subscription provider and the second realm to appear in the string is that of the operator through which the AAA messaging will be routed.

An example decorated NAI according to Option 3 that includes a cell ID (underlined text) is provided below.

wlan.mnc015.mcc234.3gppnetwork.org!Auth_type<Identity_desc>@wlan.cellid523768193.mnc071.mcc610.3gppnetwork.org.

Option 4 (Decorated NAI Realm Includes eNB ID)

An example decorated NAI according to Option 4 that includes an eNB ID (underlined text) is provided below:

wlan.mnc015.mcc234.3gppnetwork.org!Auth_type<Identity_desc>@wlan.enbid83456789.mnc071.mcc610.3gppnetwork.org Options for signaling UE Identity In each of the example NAIs depicted above according to Options 1-4, an "Identity_desc" string represents an identifier corresponding to a UE. Examples of identifiers can include the following:

An identity known to the LTE core network, such as:
International Mobile Subscriber identity (IMSI), which is an identifier of a user or subscriber associated with the UE, or
Globally Unique Temporary Identifier (GUTI), which is a temporary identifier generated to identify the UE.

An identity (referred to as a "radio access network identity") known to an LTE eNB, such as:
Radio Network Temporary Identity (RNTI), which is a temporary identifier of the UE that is assigned to the UE by the radio access network in RRC messaging, or
A WLAN MAC address, which identifies a WLAN interface of the UE and can be exchanged between UE and eNB during cellular attach.

In other examples, other identifiers corresponding to a UE can be employed.

Use of a radio access network identity (e.g. RNTI or MAC address) is possible because in some solutions described herein the eNB is capable of handling the authentication procedure autonomously (without accessing an HSS/AAA server or core network). In addition, the eNB may be able to map an RNTI or a MAC address to a core network identity. Temporary identities may be used for reasons of privacy.

Figure 3:
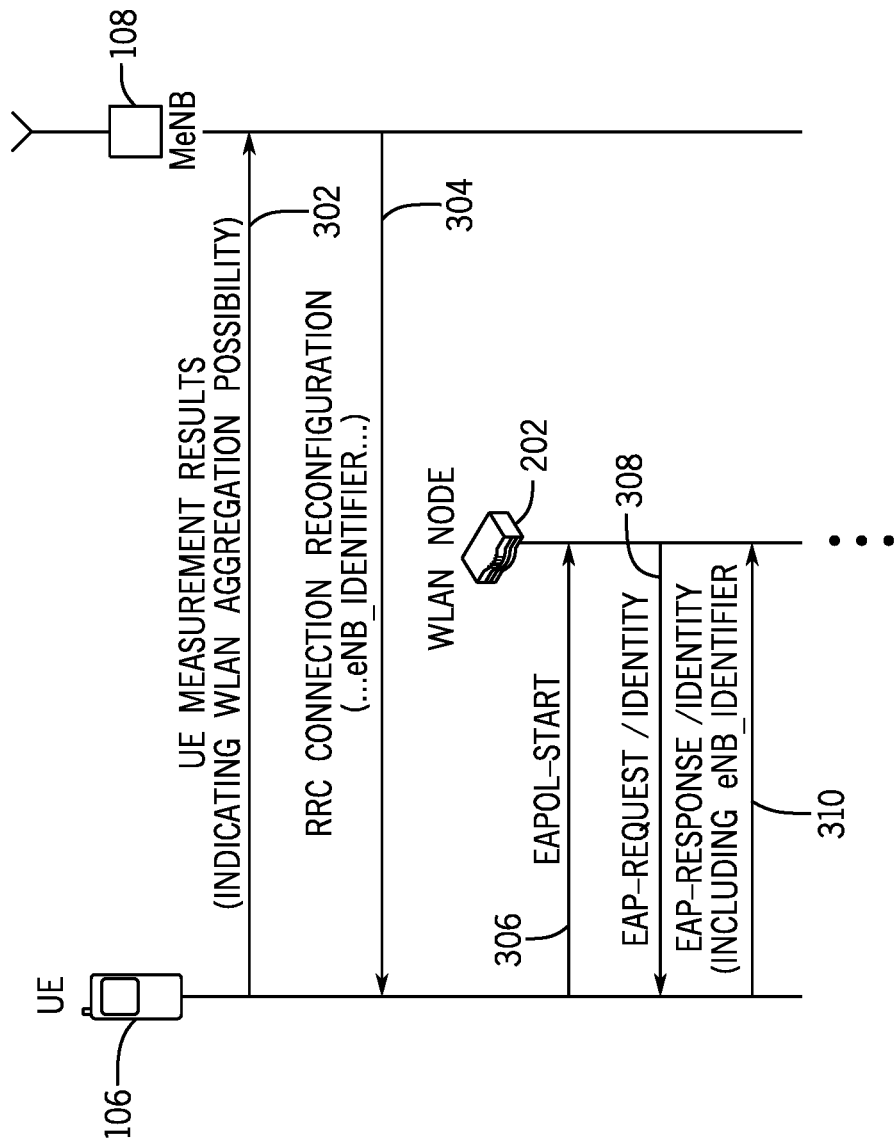
FIG. 3 is a message flow diagram of another example process according to further implementations.

The "Identity_desc" string (representing a identifier corresponding to a UE) and optionally a new eNB_Identifier (an identifier of an eNB) may be provided to the UE by the MeNB using RRC messaging (e.g. RRCConnectionReconfiguration command) during the process of configuring the UE for LTE-WLAN aggregation, as depicted in FIG. 3.

In FIG. 3, the UE 106 sends (at 302) measurement results including measurement of signals transmitted by various wireless access nodes, such as the MeNB 108 and a WLAN AP 110. The measurement results are sent to the MeNB 108 and can indicate that it is possible to perform LTE-WLAN aggregation (e.g. strength or power of the signals from the WLAN AP 110 measured by the UE is above a specified threshold).

In response to determining that LTE-WLAN aggregation can be performed, the MeNB 108 sends (at 304) a control message to the UE 106, where the control message includes an eNB_Identifier that is to be included in the Identity string for EAP authentication as discussed above in connection with FIG. 2. In some examples, the control message (sent at 304) can include a RRCConnectionReconfiguration command.

Further messages 306, 308, and 310 shown in FIG. 3 correspond to messages 204, 206, and 208, respectively, in FIG. 2. In the EAP-Response/Identity message sent at 310, the Identity string includes eNB_Identifier that was sent by the MeNB 108 in the RRCConnectionReconfiguration command sent at 304.

In some examples, the following changes can be made to the 3GPP TS 36.331 (changes underlined).

RRCConnectionReconfiguration

The RRCConnectionReconfiguration message is a command to modify an RRC connection. It may convey information for measurement configuration, mobility control, radio resource configuration (including resource blocks (RBs), MAC main configuration, and physical channel configuration) and any associated dedicated non-access stratum (NAS) information and security configuration.

Signaling radio bearer: SRB1
RLC-SAP: AM
Logical channel: DCCH
Direction: E-UTRAN to UE
RRCConnectionReconfiguration Message

```
-- ASN1START
<unchanged IEs omitted>
SecurityConfigHO ::=                        SEQUENCE {
    handoverType                                CHOICE {
        intraLTE                                    SEQUENCE {
            securityAlgorithmConfig                     SecurityAlgorithmConfig     OPTIONAL,    --
Cond fullConfig
            keyChangeIndicator                          BOOLEAN,
            nextHopChainingCount                        NextHopChainingCount
        },
        interRAT                                    SEQUENCE {
            securityAlgorithmConfig                     SecurityAlgorithmConfig,
            nas-SecurityParamToEUTRA                    OCTET STRING (SIZE(6))
        }
    },
}
SecurityConfigWlanAggregation::=                                    SEQUENCE {
    mEnbIdType                              CHOICE {
        ueDerived                               NULL
        signalled                               SEQUENCE {
            mEnbId                                  OCTET STRING (SIZE(6))
        }
    }
    ...
}
-- ASN1STOP
```

| RRCConnectionReconfiguration field descriptions |
|---|
| ...<br>mEnbldType<br>This field is used to indicate whether a UE derived ID (i.e. derived using the cell ID + PLMN ID) is used as NAI in the EAP-Response/Identity message or if an ID signalled by the MeNB is used instead<br>  - If mEnbldType is set to ueDerived then cell ID + PLMN ID is used as the NAI<br>  - If mEnbldType is set to signalled then the signalled mEnbld is used in the construction of the NAI. |

Network Provided Indication to Use WLAN-LTE Aggregation Type Authentication

In some implementations, to address Issue 2 discussed further above, a network (such as the MeNB 108) can provide an indication to the UE regarding which of multiple authentication procedures that the UE should use to gain access to WLAN resources when operating in LTE-WLAN aggregation mode.

The UE can choose between use of a first type of authentication procedure in which authentication messages are routed between a WLAN node and a cellular access network node (e.g. MeNB 108), and a second type of authentication procedure in which authentication messages are routed between the WLAN node and an AAA server (e.g. 120 in FIG. 1A).

The first type of authentication procedure can include any of various techniques discussed herein, including using a modified NAI (that includes an identifier for an eNB) as discussed above, and/or generating and using keys as discussed further below.

The second type of authentication procedure is the traditional authentication procedure, such as Wi-Fi Protected Access (WPA2) from the Wi-Fi Alliance, between a WLAN node and an AAA server to gain access to WLAN resources.

In some example implementations, the UE can be notified by the network using RRC messaging of the type of authentication procedure that the UE should apply.

The indication of the type of authentication procedure to use may be explicit. Such explicit indication can be included in the RRCConnectionReconfiguration command, which can be used to configure use of the WLAN-based small cell. As an example, the following information element (IE) can be added to the RRCConnectionReconfiguration command:

WLANAuthenticationType IE (enumerated values: AAA routed, eNB routed, . . . )

If the WLANAuthenticationType IE is set to the value "eNB routed," then the first type of authentication procedure is employed. On the other hand, if the WLANAuthenticationType IE is set to the value "AAA routed," then the second type of authentication procedure is used.

In alternative implementations, the indication to use the first type of authentication procedure can be an implicit indication, which can be provided using the signaling of (or implicitly by the presence of) an eNB ID (e.g. eNB_Identifier discussed above) in the RRCConnectionReconfiguration message used for WLAN configuration. Since such an eNB ID would only be supplied to the UE for the purpose of building an NAI that includes the eNB ID, its presence implicitly indicates the usage of the first type of authentication procedure.

The signaling of the above indications of types of authentication procedures to use is such that a UE knows which type of authentication procedure to use with which WLAN, where a WLAN type can be denoted using a service set identification (SSID) or basic SSID (BSSID), for example.

Processing of Authentication Messages at the MeNB

The following describes example techniques or mechanisms for processing authentication messages (such as EAP messages) from a UE at the MeNB 108.

In a first type of solution, the MeNB 108 behaves as an authentication proxy.

In a second type of solution, the MeNB 108 behaves as an autonomous authentication server.

MeNB Acting as an Authentication Proxy

This solution addresses Issue 1 but does not address Issue 3.

As discussed above in connection with FIG. 2, in response to an EAP message from a UE, a WLAN node (e.g. WLAN node 202 in FIG. 2) sends an authentication message to the MeNB 108. In response to receiving the authentication message from the WLAN node 202, the MeNB acting as an authentication proxy involves the core network (and ultimately the HSS 118 in FIG. 1) in performing the authentication of the UE, and any authentication signaling (e.g. AAA signaling) would extend between UE and HSS 118.

Traditionally, AAA signaling is communicated between a WLAN node and an AAA server. In some implementations of the present disclosure, AAA signaling is routed via the MeNB 108.

Figure 4:
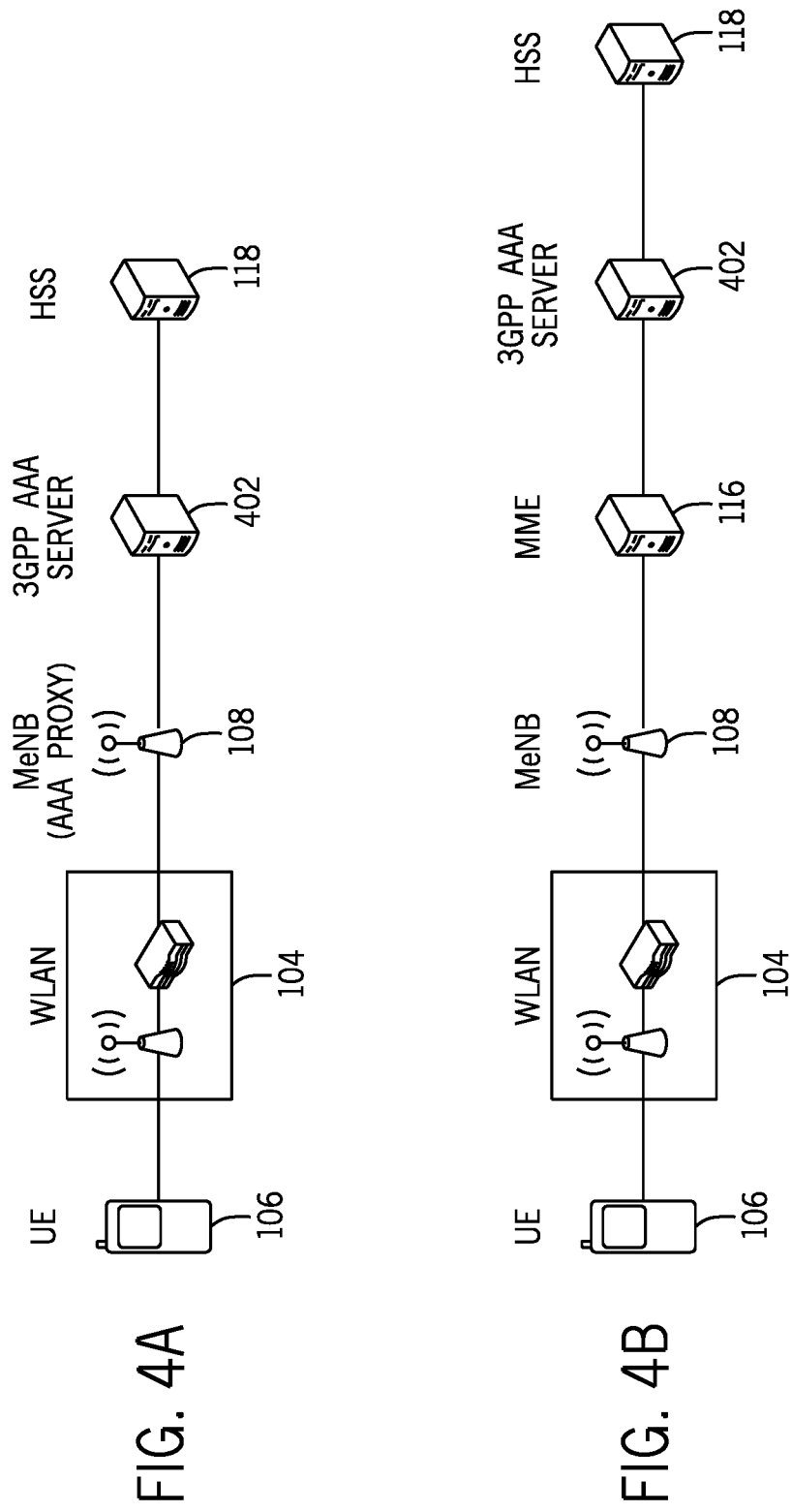
FIGS. 4A and 4B are block diagrams of example arrangements for routing authentication messages between a user equipment (UE) and a home subscriber server (HSS), according to further implementations.

Different options for the routing of authentication messages between the UE 106 and the HSS 118 via the MeNB 108 are shown in FIGS. 4A and 4B, respectively.

In FIG. 4A, authentication messages are routed between the UE 106 and the HSS 118 through the WLAN 104, the MeNB 108 behaving as an AAA proxy, and a 3GPP AAA server 402. In the option of FIG. 4A, connectivity between the MeNB 108 and the 3GPP AAA server 402 in the core network is provided.

In FIG. 4B, authentication messages are routed between the UE 106 and the HSS 118 through the WLAN 104, the MeNB 108, the MME 116, and a 3GPP AAA server 402.

Upon receiving an EAP-Request containing an Identity string from the UE 106, the MeNB 108 sends an authentication message to either the 3GPP AAA server 402 (FIG. 4A) or to the MME 116 (FIG. 4B). To authenticate the UE 106, the HSS 118 uses an identifier corresponding to the UE 106. As discussed above, this identifier corresponding to the UE can be an IMSI provided in the "Identity_desc" string of an NAI, or alternatively, if a radio access network identity (e.g. RNTI or MAC address discussed above) is used in the NAI, the MeNB 108 replaces the radio access network identity with a core network identity such as IMSI. One way in which the MeNB 108 can determine the IP address of the correct 3GPP AAA server in the system architecture of FIG. 4A is by performing a DNS lookup using the part of the NAI realm which identifies the cellular network operator.

As discussed above, either a root NAI or a decorated NAI can be used depending on whether the UE 106 is cellular roaming or not. The root NAI is used if the UE 106 is not cellular roaming, and the decorated NAI is used when the UE 106 is cellular roaming. The decorated NAI may be appropriate if the message has to pass through first an AAA server in the VPLMN and then to an AAA server in the HPLMN (this case of two AAA servers is not shown in FIG. 4A or 4B). The part of the NAI that includes the identifier for the eNB (e.g. cell ID or eNB ID) can be removed by the MeNB 108.

Figure 5:
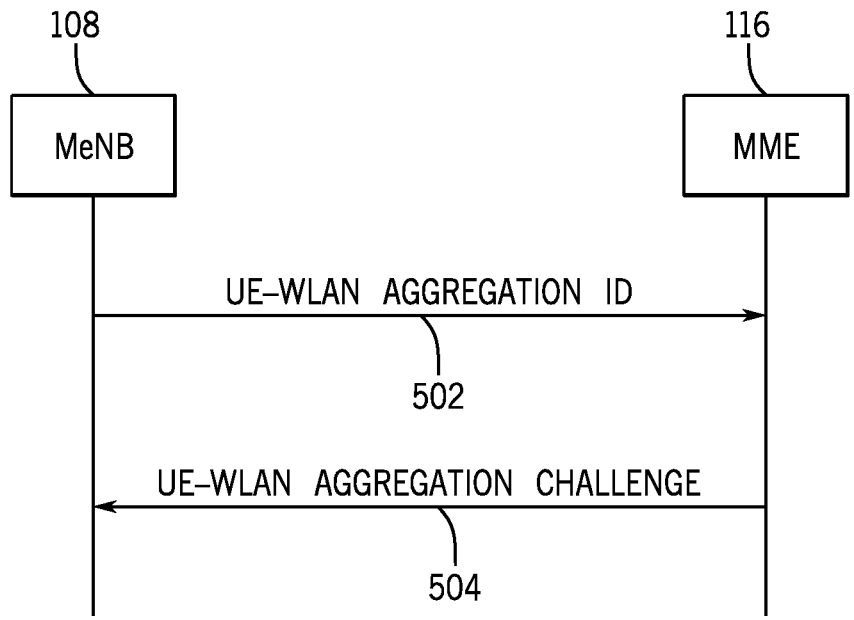
FIG. 5 is a message flow diagram of an example process between a cellular access network node and a control node, according to some implementations.

If the option of FIG. 4B is used, then the EAP message can potentially be forwarded to the MME 116 in a transparent container included in a message such as an UE-WLAN aggregation ID message sent (at 502) from the MeNB 108 to the MME 116, as shown in FIG. 5. The UE-WLAN aggregation ID which may be the IMSI of the user of the UE or any other identifier corresponding to the UE 106.

The MME 116 can then unpack the EAP message and forward the unpacked EAP message to the appropriate AAA server (e.g. 402 in FIG. 4B). The NAI within the EAP message can have sufficient information for the MME 116 to determine to which AAA server the unpacked EAP message should be forwarded (such as an NAI of the conventional form without the identifier for the eNB as discussed above).

In response to the UE-WLAN aggregation ID message, the MME 116 sends (at 504) a UE-WLAN aggregation challenge to the MeNB 108, where the UE-WLAN aggregation challenge may have been issued by the HSS 118 or AAA server 402. The UE-WLAN aggregation challenge message contains a challenge vector.

In a radio access network (RAN) sharing scenario there may be multiple MMEs (in different PLMNs) connected to the MeNB 108. To support this scenario the MeNB 108 may have to read the NAI to determine which MME to forward the EAP message (assuming IMSI is used as Identity_desc). If, on the other hand, a radio access network identity is used as Identity_desc (examples discussed above) in the NAI, or if the EAP message arrives in an X2-AP message that is associated with a particular user, then the MeNB 108 can do a table lookup to determine which particular MME (i.e. which S1-C link) should be used for the forwarding of the transparent container.

The following describes example changes to 3GPP TS 36.413 to enable the signaling between the MeNB 108 and the MME 116 as shown in FIG. 5.

UE WLAN-Aggregation Authentication Messages

UE-WLAN Aggregation ID

The UE-WLAN aggregation ID message (shown in table below) is sent by the MeNB and is used to request the MME to transmit a corresponding challenge vector for EAP challenge response to be sent to the UE. The direction is eNB→MME.

| IE/Group Name | Presence | Range | IE type and reference | Semantics description | Criticality | Assigned Criticality |
|---|---|---|---|---|---|---|
| NAS transparent container | M | | | | | |
| > IMSI | M | | 9.2.3.11 | | | |
| > Access Type | M | | OCTET STRING {Size(6)} | | | |
| > Access Network ID | M | | OCTET STRING {Size(32)} | SSID of WLAN | | |

UE-WLAN Aggregation Challenge

The UE-WLAN aggregation challenge message (shown in the Table below) is sent by the MME and is used to transmit the IEs that are used for challenging the UE during EAP exchange for WLAN authentication. The direction is MME→eNB.

| IE/Group Name | Presence | Range | IE type and reference | Semantics description | Criticality | Assigned Criticality |
|---|---|---|---|---|---|---|
| NAS transparent container | M | | | | | |
| > RAND | M | | Integer | | | |
| > AUTN | M | | OCTET STRING {Size(6)} | | | |
| > MAC | M | | OCTET STRING {Size(32)} | | | |
| > Protected Pseudonym | M | | OCTET STRING {Size(32)} | | | |
| > Protected re-authentication id | M | | OCTET STRING {Size(32)} | | | |

-continued

| IE/Group Name | Presence | Range | IE type and reference | Semantics description | Criticality | Assigned Criticality |
|---|---|---|---|---|---|---|
| > Access network id | M | | OCTET STRING {Size(32)} | | | |

MeNB Handles EAP Messaging Autonomously

The foregoing discusses the first type of solution in which the MeNB 108 behaves as an authentication proxy. The following discusses the second type of solution in which the MeNB 108 behaves as an autonomous authentication server.

The second type of solution addresses both Issue 1 and Issue 2.

With the second type of solution, it is assumed that the MeNB 108 obtains a key Kwlan (discussed below). Hierarchically, this key may be at the same security level as KeNB generated at the MME 116. The MME 116 generates KeNB using a NAS Uplink Count, which is a counter of NAS messages.

The key Kwlan can be made known to the MeNB 108. The key Kwlan can be used by both the MeNB 108 and the UE 106 to perform WLAN EAP authentication/authorization challenges and in the computation of WLAN-specific keys for ciphering and integrity protection.

The MeNB 108 either generates Kwlan or is provided with Kwlan from the MME 116. The UE 106 is able to generate Kwlan from a master key K, which is stored on a Universal Subscriber Identity Module (USIM) of the UE 106.

Figure 6:
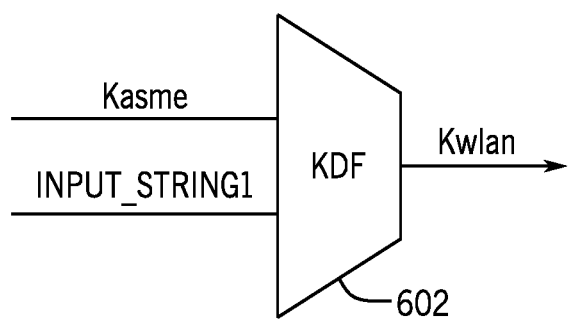
FIG. 6 is a block diagram of a key derivation function, according to some implementations.

As shown in FIG. 6, the key Kwlan can be generated by using a key derivation function (KDF) 602, in a similar manner as the generation of KeNB. The KDF 602 receives two inputs: (1) an input key (Kasme in FIG. 6) that is usually a secret value that does not leave the security domain within which the key is known or derived, and (2) an input string (INPUT_STRING1 in FIG. 6) that may or may not be secret and can be constructed using a predetermined set of parameters or values.

INPUT_STRING1 used in the generation of Kwlan can be stored and forwarded to the UE 106 to enable the UE 106 to also generate Kwlan (note that the other input, Kasme, can be generated by UE 106).

In some implementations, a Serving Network Identity (SN ID) can be used in determining Kasme (Kasme is the EPS session master key).

As an example, INPUT_STRING1 can be a random number generated by the MME 116, and this random number is then transmitted to the UE 106 during the attach procedure of the UE 106 (e.g. by including the random number in a Authentication Request message sent from the MME 116 to the UE 106). The Authentication Request message is described in 3GPP TS 24.301. Alternatively, INPUT_STRING1 can be a value that is known to both the UE 106 and the MeNB 116, and which can change. Such a value would not have to be signaled to the UE. An example of such a value is an RRC message counter.

The following underlined text can be added to 3GPP TS 33.401 to support the above, where FC is an identifier of a particular variant of key derivation function.

Annex A (normative):
Key Derivation Functions
A.1 KDF interface and input parameter construction . . .
A.16 Derivation of Kwlan at MME This input string is used when the MME and UE derive Kwlan from Kasme for WLAN-Aggregation. The following input parameters shall be used to form the input string to the Key Derivation Function:
FC=0x1D
P0=Value of the random non-negative integer generated at the MME
L0=length of the non-negative integer generated in the above step (i.e. 0x00 0x02)
The Input Key is to be Kasme.

Figure 7A:
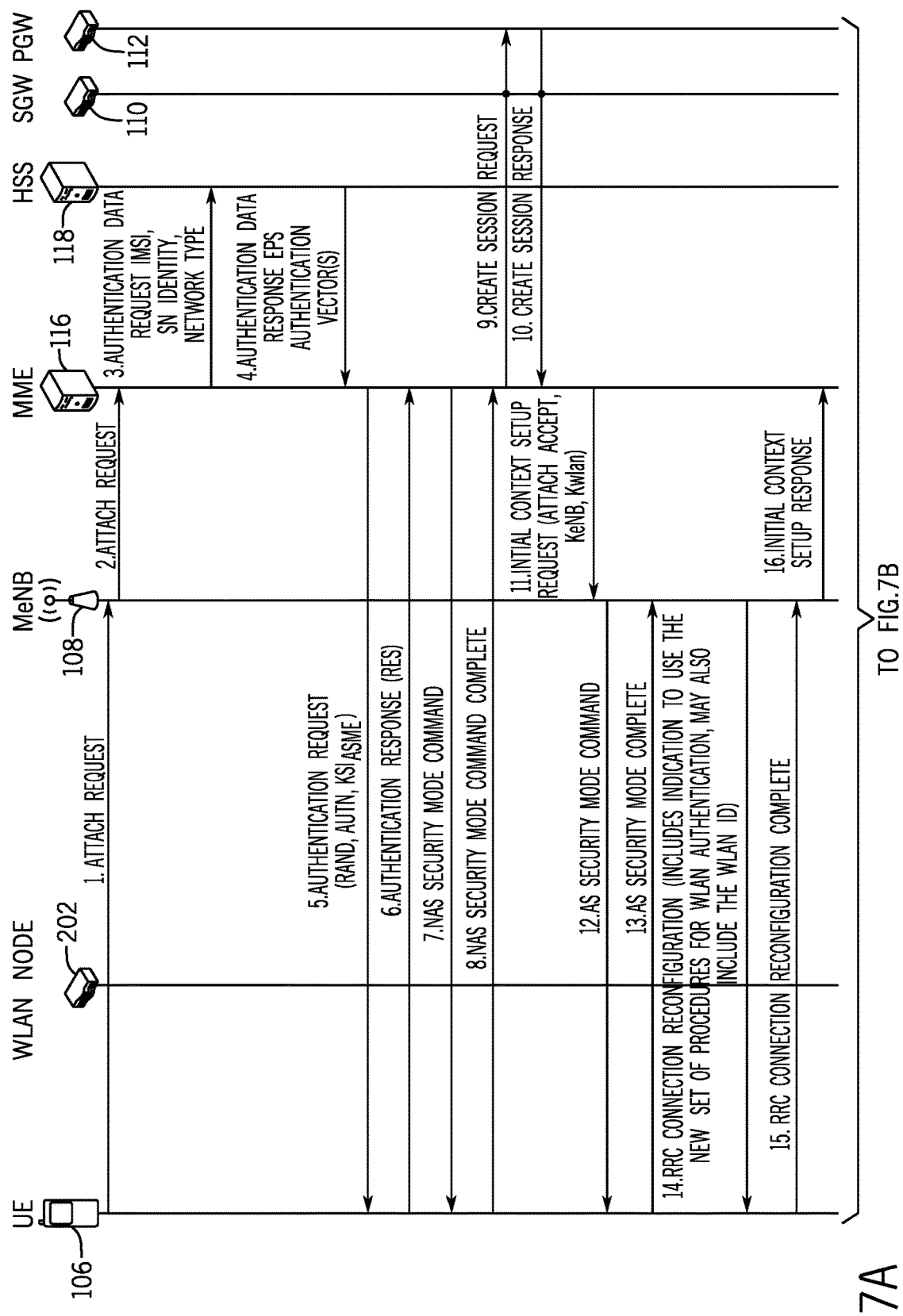
FIGS. 7A-7B are a message flow diagram of an example cellular attach and security establishment procedure, according to some implementations.
Figure 7B:
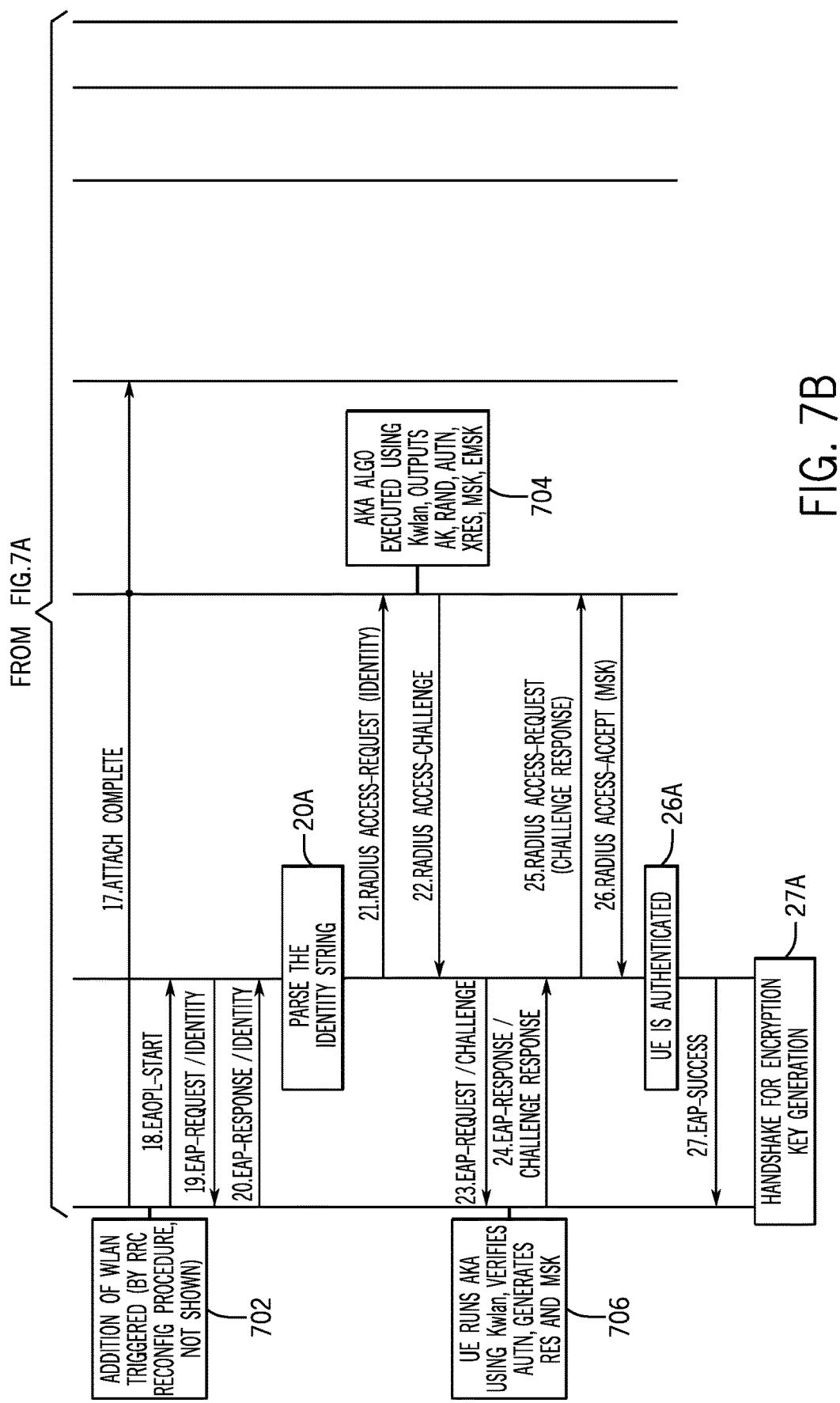

FIGS. 7A-7B illustrate a modified LTE attach and security establishment procedure that is according to 3GPP TS 23.401. Modifications from the LTE attach and security establishment procedure that is according to 3GPP TS 23.401 shown in FIGS. 7A-7B are discussed below; the remaining messages that are according to 3GPP TS 23.401 are not discussed further.

As shown in FIGS. 7A-7B, message 11 is an Initial Context Setup Request message sent by the MME 116 to the MeNB 108. In some implementations, the Initial Context Setup Request message can be modified to include the key Kwlan as discussed above. In other implementations, the key Kwlan is not included in the Initial Context Setup Request message.

Message 14 in FIGS. 7A-7B is an RRCConnectionReconfiguration message sent from the MeNB 108 to the UE 106. As discussed above, the RRCConnectionReconfiguration message can include an indication of which of different types of authentication procedures to use, such as the first type of authentication procedure and the second type of authentication procedure discussed above). The RRCConnectionReconfiguration message can also include an identifier of a WLAN (WLAN ID) for which the particular authentication type applies.

FIGS. 7A-7B also show a task 702 that corresponds to adding a WLAN (for the LTE-WLAN aggregation mode) that is triggered at the UE 106 in response to an RRC reconfiguration procedure not shown in FIGS. 7A-7B.

Messages and/or tasks 18, 19, 20, 20a, 21, 22, 23, 24, 25, 26, 26a, 27, and 27a in FIGS. 7A-7B correspond to messages and/or tasks 204, 206, 208, 210, 212, 214, 216, 218, 220, 222, 224, 226, and 228, respectively, in FIG. 2.

Figure 8:
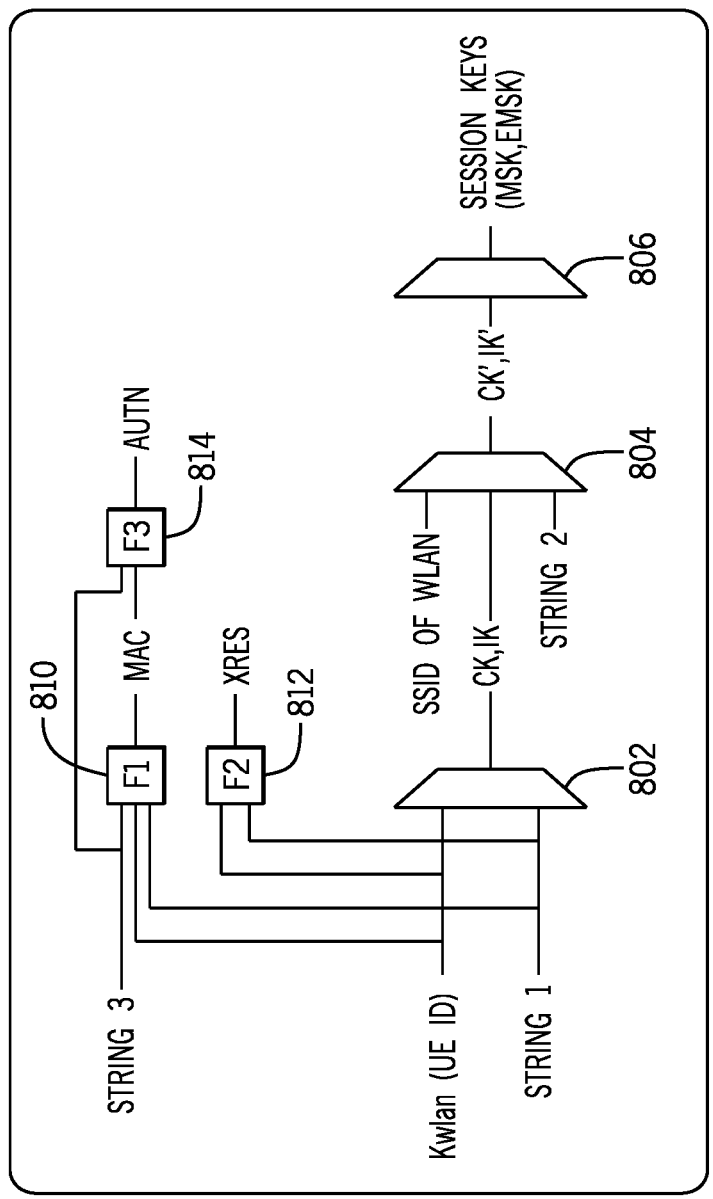
FIG. 8 is a block diagram of a sequence of key derivation functions, according to some implementations.

FIGS. 7A-7B also show a task 704 at the MeNB 108, which includes performance of an EAP-Authentication and Key Agreement (AKA) (EAP-AKA or EAP-AKA') algorithm that uses Kwlan as input and outputs AK, RAND, AUTN, XRES, MSK (Master Session Key), and EMSK (Extended Master Session Key), as shown in FIG. 8.

EAP is an authentication framework that supports multiple authentication methods called EAP methods. AKA and AKA' are processes according to 3GPP that utilize credentials stored on the USIM and on the HSS. EAP-AKA and EAP-AKA' is an authentication process that can be applied. EAP-AKA' is similar to EAP-AKA except that EAP-AKA' provides a binding of derived keys to an access network identity. EAP-AKA' is described in RFC 5448, entitled "Improved Extensible Authentication Protocol Method for 3rd Generation Authentication and Key Agreement (EAP-AKA')," dated May 2009.

The performance of the EAP-AKA or EAP-AKA' process in task 704 can include requesting an AKA vector, and the return of an AKA vector containing various content, such as the output of key derivation functions shown in FIG. 8 (discussed further below). In some implementations, the request of the AKA vector can be sent from the MeNB 108 to the HSS 118, possibly via an MME 116 and/or a 3GPP AAA Server 402, after which the HSS 118 responds with the AKA vector. In other implementations in which the MeNB 108 performs the authentication tasks autonomously, the MeNB 108 can produce the AKA vector. Further details regarding EPA-AKA' is provided by 3GPP TS 33.402 and RFC 5448.

FIGS. 7A-7B also show a task 706 at the UE 106 that includes running AKA using Kwlan, verifying AUTN, and generating RES and MSK.

In FIGS. 7A-7B, the MeNB 108 generates the RADIUS Access-Challenge message (message 22) before configuring the UE in the LTE-WLAN aggregation mode. To facilitate this, all the contents of the RADIUS Access-Challenge message are generated at the MeNB 108. The contents of the RADIUS Access-Challenge message are generated by MeNB 108 using Kwlan as the secret key as shown in FIG. 8.

FIG. 8 depicts an example of how the MeNB can derive the set of parameters to enable the UE and network to mutually authenticate. KDFs (Key Derivation Functions) 802, 804, 806 are used in producing keys in response to various inputs. The output of the KDF 802 is provided as an input to the KDF 804, the output of the KDF 804 is provided as an input to the KDF 806. The output of the KDF 806 includes MSK and EMSK which are keys that may for example be used in the encryption of WLAN traffic. A number of other functions are also provided to derive other parameters used as part of the process by which the UE and the network mutually authenticate. Function F1 810 provides a Message Authentication Code which is checked by the UE to determine the authenticity of the authentication message from the network. Function F3 is used to produce an Authentication Token which the UE can also derive and use in a comparison check in order to authenticate the network. Function F2 812 is used to produce XRES (expected result) which is also the value that the UE is expected to derive and then provide to the network in the RES parameter so that the network can authenticate the UE. Parameters including String 1 String 2, String 3, which are the so-called KDF-INPUT parameters and the identity of the KDF (Key Derivation Function) are supplied by the network to the UE except in cases where the UE is capable of reliably determining them autonomously.

The following table compares parameters used in the key generation algorithm depicted in FIG. 8 with parameters used in the key generation used in a traditional EAP-AKA' algorithm.

| Parameter used in EAP-AKA' algorithm | Parameter used in FIG. 8 Solution |
|---|---|
| K | Kwlan |
| IMSI | UEID<br>This can be any UE ID known at the RAN, e.g. RNTI, UE's MAC address used for the WLAN, etc. |
| SQN (Sequence Number) | String 1<br>This can be a string that the network has created randomly and which can be signalled to the UE. Alternatively String 1 can be a string that includes a component which changes in a way which is known to both UE and MeNB such as a string which is derived from an RRC message counter. |
| SQN, AK (Anonymity Key) | String 2<br>This can be a string that the network has created randomly and which can be signalled to the UE. Alternatively String 1 can be a string that includes a component which changes in a way which is known to both UE and MeNB such as a string which is derived from an RRC message counter. |
| SQN, AMF (Authentication and key Management Field) | String 3<br>This can be a string that the network has created randomly and which can be signalled to the UE. Alternatively String 3 can be a string that includes a component which changes in a way which is known to both UE and MeNB such as a string which is derived from an RRC message counter. |
| Access Network Identity | SSID of WLAN |

One can note, with reference to FIG. 6, that the key Kasme is used as the secret key input for the algorithm that is used to derive Kwlan. Alternatively, any other key such as the KeNB may also be used as the input. In other words, the above algorithm may be run by replacing Kasme with KeNB in FIG. 6.

If KeNB is used, since a new KeNB is generated when the MeNB changes, this algorithm can then be re-executed upon handover using the new KeNB (i.e. KeNB after handover). The rest of the algorithm remains the same. The assumption here is that at handover (i.e. MeNB change), a WLAN is removed and added again (by the new MeNB).

Another alternative technique is to derive Kwlan at the HSS 116 and at the USIM (i.e. at the same security hierarchy level that Kasme is derived), by using the same key derivation function and inputs as are used in deriving Kasme but with a different serving network identity (SN ID string). The SN ID string can be a fixed string that is to be used whenever the device is using a WLAN in LTE-WLAN aggregated mode when cellular attached to a given PLMN.

Options for Transporting Authentication Messages Between WLAN and MeNB

This solution can be used for addressing Issue 1.

There are a number of ways by which information used to complete authentication over the WLAN can be conveyed between the WLAN and the MeNB 108. The following are examples of ways of transporting authentication messages:
  Transport an EAP message in a DIAMETER or RADIUS message using Stream Control Transmission Protocol/Internet Protocol (SCTP/IP) between the WLAN and the MeNB. A DIAMETER message is according to the Diameter Base Protocol, while a RADIUS message is according to the RADIUS protocol.
  Use an X2-AP transparent container for conveyance of DIAMETER or RADIUS message between the WLAN and the MeNB.
  Use an X2-AP transparent container for direct conveyance of an EAP message between the WLAN and the MeNB.
  Extract content of an EAP messages and place the extracted content in an X2-AP message between the WLAN and the MeNB.

Further details on the foregoing ways of transporting authentication messages are provided below.

EAP Message Conveyed Using DIAMETER or RADIUS on SCTP/IP

DIAMETER and RADIUS are protocols that support the conveyance of EAP messages. The RADIUS protocol is more prevalent in WLANs, whereas DIAMETER is used by 3GPP.

Figure 9:
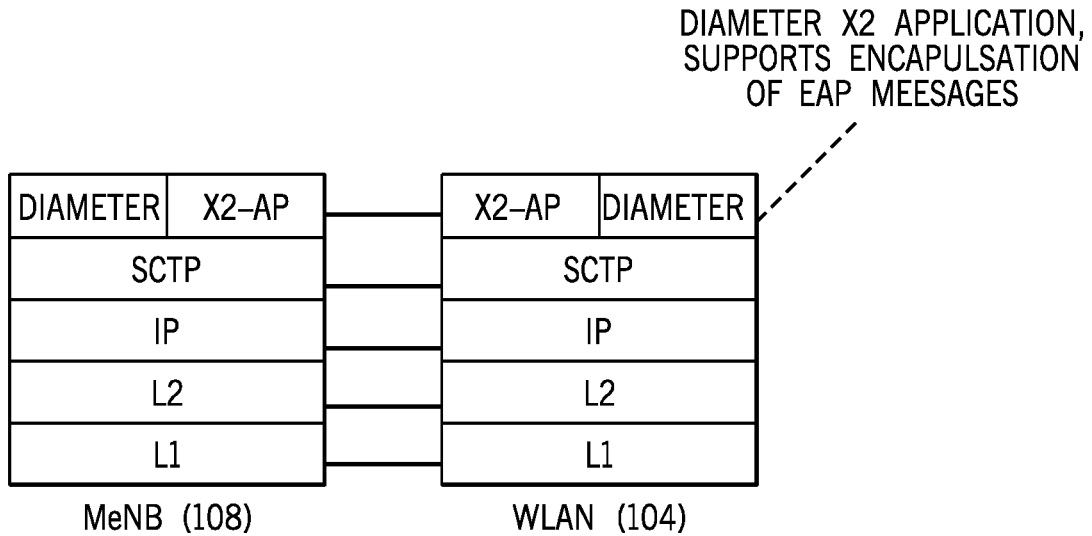
FIGS. 9 and 10 are block diagrams of example protocol layers in a cellular access network node in a wireless local area network, according to some implementations.

FIG. 9 is a block diagram of protocol layers in the MeNB 108 and the WLAN 104 (either a WLAN AP or a combination of a WLAN AP and a WLAN gateway). The protocol layers in each of the MeNB 108 and the WLAN 104 include layer 1 (physical layer), layer 2 (data link layer), an IP layer above layer 1, and an SCTP layer above the IP layer. In addition, a DIAMETER layer and optionally an X2-AP layer is included in each of the MeNB 108 and the WLAN 104. Using the arrangement of FIG. 9, a DIAMETER message communicated between the DIAMETER layers of the MeNB 108 and the WLAN 104 can encapsulate an EAP message.

In other implementations of the present disclosure, RADIUS layers can be provided in the MeNB 108 and the WLAN 104 to carry RADIUS messages that can encapsulate EAP messages.

EAP Conveyed Using DIAMETER or RADIUS in an X2-AP Transparent Container

Figure 10:
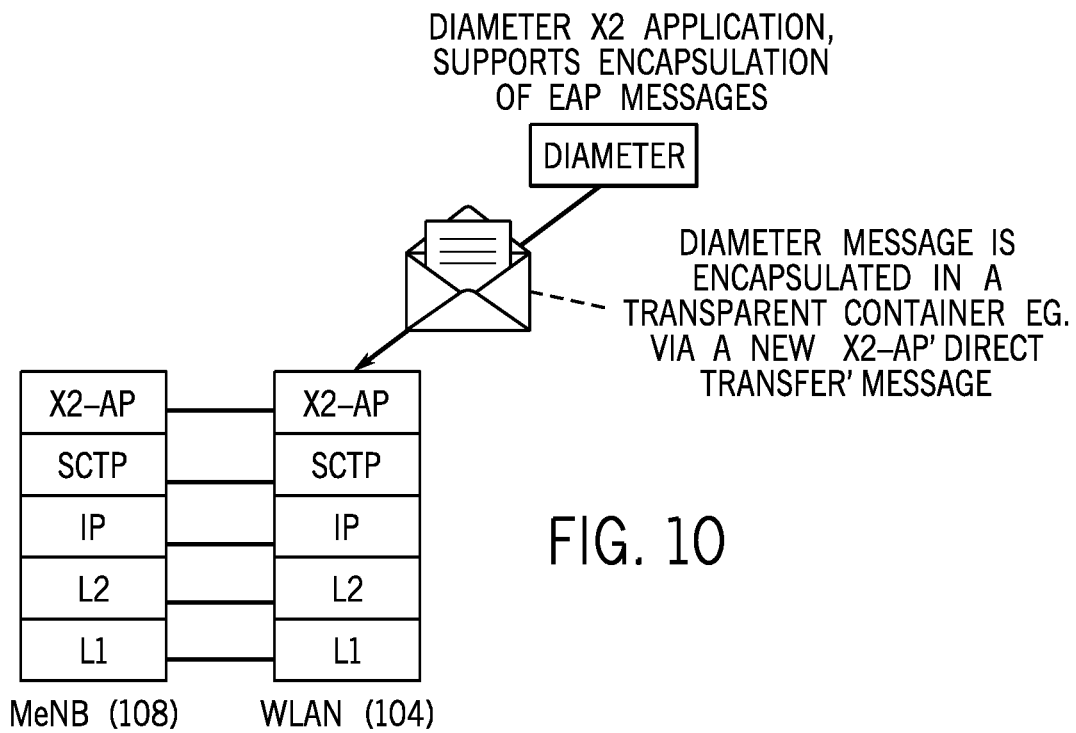

In alternative implementations, as shown in FIG. 10, an EAP message is first encapsulated into a DIAMETER or RADIUS message, and the DIAMETER or RADIUS message is in turn carried in an X2-AP message between WLAN node 202 and the MeNB 108.

The protocol layers of each of the MeNB 108 and the WLAN 104 include a layer 1, a layer 2, an IP layer, an SCTP layer, and an X2-AP layer above the SCTP layer. The X2-AP message that carries the DIAMETER or RADIUS message supports what is referred to in 3GPP as a transparent container, which means that the X2-AP layer itself does not interpret the contents of the transparent container, but the contents (in this case a DIAMETER or RADIUS message) are made available to the MeNB 108 for further processing.

Although FIG. 10 shows an example in which a DIAMETER message is carried by an X2-AP transparent container, in other examples, a RADIUS message instead can be carried by an X2-AP transparent container.

EAP Message Conveyed Directly in an X2-AP Transparent Container

In this solution, an EAP message is carried directly within the X2-AP transparent container, rather than first encapsulated in a DIAMETER or RADIUS message which is then in turn carried by an X2-AP transparent container.

Contents of EAP Message are Conveyed in X2-AP Message

In this solution, the contents of the EAP-AKA' messaging are carried directly as new information elements within a new X2-AP message. Contents of EAP-AKA' messaging which is to be supported in EAP messages include information elements such as NAI, RAND, AUTN, MAC, and so forth.

System Architecture

Figure 11:
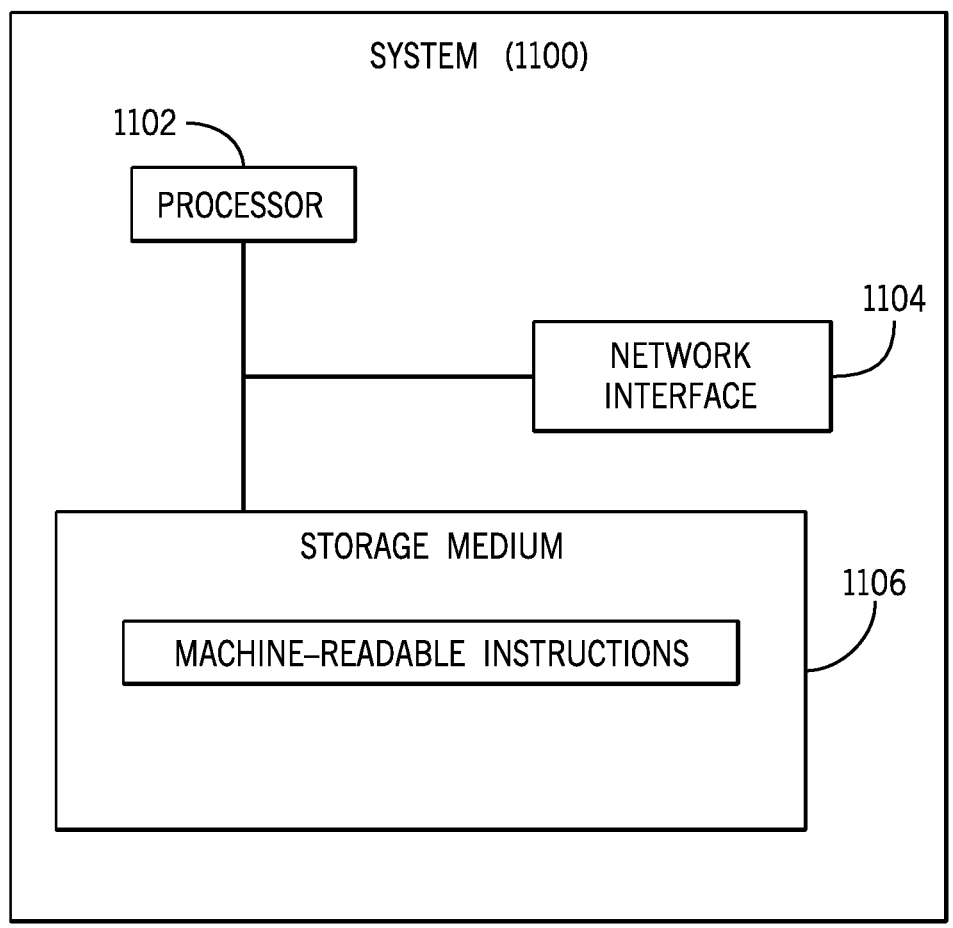
FIG. 11 is a block diagram of an example system according to some implementations.

FIG. 11 is a block diagram of an example system (or network node) 1100, which can represent any one of: a UE, a cellular access network node, or a WLAN node. The system 1100 can be implemented as a computing device or an arrangement of multiple computing devices.

The system 1100 includes a processor (or multiple processors) 1102, which can be coupled to a network interface (or multiple network interfaces) 1104 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 1102 can also be coupled to a non-transitory machine-readable or computer-readable storage medium (or storage media) 1106, which can store machine-readable instructions 1108 that are executable on the processor(s) 1102 to perform various tasks as discussed above.

The storage medium (or storage media) 1106 can include one or multiple computer-readable or machine-readable storage media. The storage medium or storage media can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
sending, by a user equipment (UE) to a wireless access node in a wireless local area network (WLAN), a network access identifier (NAI) that includes an identifier of a cellular access network node to identify the cellular access network node to be used to perform an authentication procedure, wherein the identifier of the cellular access network node comprises a cell identifier, the wireless access node to select the cellular access network node based on the identifier of the cellular access network node, and to send an authentication message to the cellular access network node; and
receiving, by the UE, an authentication challenge based on information in the NAI.

2. The method of claim 1, wherein sending the NAI to the wireless access node in the WLAN is to cause the wireless access node to send, based on the identifier of the cellular access network node in the NAI, the authentication message to the cellular access network node.

3. The method of claim 1, wherein the cell identifier included in the NAI identifies a cell in a cellular access network.

4. The method of claim 1, wherein the NAI including the identifier of the cellular access network node comprises a root NAI or a decorated NAI.

5. The method of claim 4, wherein the NAI further comprises an identifier corresponding to the UE, the identifier corresponding to the UE being different from the identifier of the cellular access network node, and wherein the identifier corresponding to the UE is selected from among an International Mobile Subscriber Identity (IMSI), a Globally Unique Temporary Identifier (GUTI), a Radio Network Temporary Identity (RNTI), and a Medium Access Control (MAC) address.

6. The method of claim 1, wherein the sending of the NAI comprises sending the NAI in an Extensible Authentication Protocol (EAP) message.

7. The method of claim 1, further comprising:
receiving a network-provided indication of whether a first type authentication procedure or a second type authentication procedure is to be used, the first type authentication procedure involving receiving an input value from the cellular access network node and generating a key based on the input value, and the second type authentication procedure routing authentication messages between a WLAN node and an Authentication, Authorization, and Accounting (AAA) server; and
selecting, by the UE based on the network-provided indication, from among the first type authentication procedure and the second type authentication procedure,
wherein the sending of the NAI that includes the identifier of the cellular access network node is responsive to selecting the first type authentication procedure.

8. The method of claim 1, wherein the NAI further comprises an identifier of a domain of a cellular operator of a cellular access network that includes the cellular access network node, wherein the cell identifier included in the NAI identifies a cell in the cellular access network.

9. The method of claim 1, wherein the received authentication challenge is sent by the wireless access node in the WLAN to the UE in response to the wireless access node in the WLAN receiving an authentication challenge sent by the cellular access network node identified by the identifier in the NAI.

10. The method of claim 1, further comprising:
receiving, by the UE, an indication of the authentication procedure to use to access the WLAN,
wherein the sending of the NAI by the UE to the wireless access node is responsive to the indication.

11. The method of claim 1, wherein the authentication challenge is from the wireless access node, and the authentication challenge is sent by the cellular access network node responsive to the authentication message, the method further comprising:
responding, by the UE, to the authentication challenge by sending, by the UE, an authentication challenge response to the wireless access node.

12. A cellular access network node comprising:
a network interface to communicate with a wireless access node in a wireless local area network (WLAN); and
at least one processor configured to:
send, to a first user equipment (UE), an indication of which of a plurality of types of authentication is to be applied by the first UE, wherein the plurality of types of authentication comprises a first type of authentication and a second type of authentication, the first type of authentication routing authentication messages between a WLAN node and the cellular access network node, and the second type of authentication routing authentication messages between the WLAN node and an Authentication, Authorization, and Accounting (AAA) server;
receive, from the wireless access node, a first authentication message to authenticate the first UE, the first authentication message being sent to the cellular access network node by the wireless access node responsive to receipt by the wireless access node from the first UE of a network access identifier (NAI) that includes an identifier of the cellular access network node to be used in an authorization procedure, wherein the cellular access network node is part of a cellular access network that is a different type of wireless access network than the WLAN;
send an authentication challenge responsive to the first authentication message; and
receive an authentication challenge response based on a response of the first UE for the authentication challenge.

13. The cellular access network node of claim 12, wherein the at least one processor is configured to:
transmit a second authentication message to a core network node to perform authentication of the first UE, wherein the second authentication message is based on the first authentication message.

14. The cellular access network node of claim 13, wherein the core network node to which the second authentication message is sent comprises the AAA server, and wherein the at least one processor is to select, based on an identifier corresponding to the first UE in the NAI, the AAA server from a plurality of AAA servers.

15. The cellular access network node of claim 14, wherein the at least one processor is configured to:
perform authentication of the first UE in response to the first authentication message.

16. The cellular access network node of claim 15, wherein the authentication of the first UE comprises using a key to perform an authentication challenge procedure of the first UE.

17. The cellular access network node of claim 16, wherein the at least one processor is configured to receive the key from a core network node, or to generate the key.

18. The cellular access network node of claim 12, wherein the cellular access network node is configured to transport information of an Extensible Authentication Protocol (EAP) message using any of the following:
transport the EAP message encapsulated in a DIAMETER or RADIUS message using Stream Control Transmission Protocol/Internet Protocol (SCTP/IP),
transport a DIAMETER or RADIUS message encapsulating the EAP message in an X2-AP transparent container,
transport the EAP message directly in an X2-AP transparent container, and
transport extracted content from the EAP message in an X2-AP message.

19. A user equipment (UE) comprising:
at least one wireless interface to communicate with a wireless access node in a wireless local area node (WLAN) and with a cellular access network node; and
at least one processor configured to:
send, to the wireless access node in the WLAN, an authentication request including a network access identifier (NAI), the NAI containing an identifier of the cellular access network node to identify the cellular access network node to be used to perform an authentication procedure, wherein the identifier of the cellular access network node comprises a cell identifier, the wireless access node to select the cellular access network node based on the identifier of the cellular access network node, and to send an authentication message to the cellular access network node; and receive an authentication challenge based on information in the NAI, the authentication challenge responsive to an authentication challenge sent by the cellular access network node as part of the authentication procedure.

20. The UE of claim 19, wherein the NAI further comprises an identifier of a domain of a cellular operator of a cellular access network that includes the cellular access network node.

21. The UE of claim 19, wherein the received authentication challenge is sent by the wireless access node in the WLAN to the UE in response to the wireless access node in the WLAN receiving the authentication challenge sent by the cellular access network node identified by the identifier in the NAI.

* * * * *